US008302146B2

(12) United States Patent
Cha et al.

(10) Patent No.: US 8,302,146 B2
(45) Date of Patent: Oct. 30, 2012

(54) BROADCAST RECEIVING APPARATUS, APPLICATION TRANSMITTING/RECEIVING METHOD AND RECEPTION STATUS INFORMATION TRANSMITTING METHOD

(75) Inventors: Sang Hoon Cha, Seoul (KR); Kyung Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 781 days.

(21) Appl. No.: 11/716,022

(22) Filed: Mar. 9, 2007

(65) Prior Publication Data

US 2008/0040769 A1 Feb. 14, 2008

(30) Foreign Application Priority Data

Mar. 17, 2006 (KR) ........................ 10-2006-0024859

(51) Int. Cl.
*H04N 7/173* (2006.01)
*H04N 7/16* (2006.01)
*G06F 13/00* (2006.01)
*G06F 13/28* (2006.01)

(52) U.S. Cl. ........ 725/134; 711/105; 711/156; 725/142; 725/114; 725/118; 725/131

(58) Field of Classification Search .................... 725/54, 725/134, 142, 114, 67, 73, 118, 131; 711/105, 711/111, 156
See application file for complete search history.

(56) References Cited

U.S. PATENT DOCUMENTS

| | | | | |
|---|---|---|---|---|
| 5,754,771 | A * | 5/1998 | Epperson et al. | 709/203 |
| 5,860,133 | A * | 1/1999 | Beaverson et al. | 711/171 |
| 5,963,249 | A * | 10/1999 | Kim | 348/178 |
| 6,360,195 | B1 * | 3/2002 | Liao et al. | 703/28 |
| 6,442,656 | B1 * | 8/2002 | Alasti et al. | 711/154 |
| 6,928,653 | B1 * | 8/2005 | Ellis et al. | 725/50 |
| 7,168,085 | B2 * | 1/2007 | Baldwin et al. | 725/50 |
| 7,478,119 | B2 * | 1/2009 | Paleczny et al. | 1/1 |
| 7,512,736 | B1 * | 3/2009 | Overby | 711/114 |
| 7,623,933 | B2 * | 11/2009 | Sarosi et al. | 700/83 |
| 7,660,998 | B2 * | 2/2010 | Walmsley | 713/189 |
| 7,895,637 | B2 * | 2/2011 | Cha | 725/152 |
| 8,060,680 | B2 * | 11/2011 | Lee et al. | 710/306 |
| 2002/0091712 | A1 * | 7/2002 | Martin et al. | 707/200 |

(Continued)

FOREIGN PATENT DOCUMENTS

CN 1655547 8/2005

(Continued)

OTHER PUBLICATIONS

Society of Cable Telecommunications Engineer: "Host-POD Interface Standard-Host-POD Interface Specification" Internet Citation, [Online] XP002408006, Apr. 2, 1999.

*Primary Examiner* — Pinkal R Chokshi
(74) *Attorney, Agent, or Firm* — McKenna Long & Aldridge LLP

(57) ABSTRACT

A broadcast receiving apparatus, application transmitting/receiving method and reception status information transmitting method are disclosed, by which information associated with a broadcast reception status can be transmitted to a broadcast transmitting terminal and by which a problem of a storage device can be transmitted to a broadcast transmitting terminal in advance in case of attempting to receive an application or the like that will be transmitted by the broadcast transmitting terminal. The present invention includes collecting information indicating a remaining size of the storage device and transmitting the collected information according to a network management protocol.

8 Claims, 18 Drawing Sheets

U.S. PATENT DOCUMENTS

| | | | | |
|---|---|---|---|---|
| 2003/0028895 | A1* | 2/2003 | Buehler et al. | 725/119 |
| 2004/0055020 | A1* | 3/2004 | Delpuch | 725/134 |
| 2004/0237108 | A1* | 11/2004 | Drazin et al. | 725/56 |
| 2005/0028206 | A1* | 2/2005 | Cameron et al. | 725/46 |
| 2005/0138667 | A1 | 6/2005 | Delpuch | |
| 2005/0188164 | A1* | 8/2005 | Ballantyne et al. | 711/159 |
| 2007/0050836 | A1* | 3/2007 | Stanek et al. | 725/131 |
| 2007/0064557 | A1* | 3/2007 | Huang | 369/47.12 |
| 2007/0157281 | A1* | 7/2007 | Ellis et al. | 725/134 |
| 2007/0162930 | A1* | 7/2007 | Mickle et al. | 725/37 |
| 2007/0162932 | A1* | 7/2007 | Mickle et al. | 725/37 |
| 2007/0204127 | A1* | 8/2007 | Lin et al. | 711/170 |
| 2007/0271433 | A1* | 11/2007 | Takemura | 711/164 |
| 2009/0282444 | A1* | 11/2009 | Laksono et al. | 725/89 |

FOREIGN PATENT DOCUMENTS

| | | |
|---|---|---|
| EP | 1624670 | 2/2006 |
| WO | WO 98/43165 | 10/1998 |

* cited by examiner

FIG. 3A

| OC-STB-HOST-MIB | | |
|---|---|---|
| **ocStbHostHWIdentifiers** | | |
| **Object** | **OCHD2** | **Access** |
| ocStbHostSerialNumber | M | RO |
| ocStbHostHostID | M | RO |
| ocStbHostCapabilities | M | RO |
| | | |
| **ocStbHostAVInterfaceTable** | | |
| **Object** | **OCHD2** | **Access** |
| ocStbHostAVInterfaceIndex | M | N-Acc |
| ocStbHostAVInterfaceType | M | RO |
| ocStbHostAVInterfaceDesc | M | RO |
| ocStbHostAVInterfaceStatus | M | RO |
| | | |
| **ocStbHostIEEE1394Table** | | |
| **Object** | **OCHD2** | **Access** |
| ocStbHostIEEE1394ActiveNodes | M | RO |
| ocStbHostIEEE1394DataXMission | M | RO |
| ocStbHostIEEE1394DTCPStatus | M | RO |
| ocStbHostIEEE1394LoopStatus | M | RO |
| ocStbHostIEEE1394RootStatus | M | RO |
| ocStbHostIEEE1394CycleIsMaster | M | RO |
| ocStbHostIEEE1394IRMStatus | M | RO |
| ocStbHostIEEE1394AudioMuteStatus | M | RO |
| ocStbHostIEEE1394VideoMuteStatus | M | RO |
| | | |

FIG. 3B

| **ocStbHostIEEE1394ConnectedDevicesTable** | | |
|---|---|---|
| **Object** | **OCHD2** | **Access** |
| ocStbHostIEEE1394ConnectedDevicesIndex | M | N-Acc |
| ocStbHostIEEE1394ConnectedDevicesAVInterfaceIndex | M | RO |
| ocStbHostIEEE1394ConnectedDevicesSubUnitType | M | RO |
| ocStbHostIEEE1394ConnectedDevicesEui64 | M | RO |
| ocStbHostIEEE1394ConnectedDevicesADSourceSelectSupport | M | RO |
| | | |
| **ocStbHostDVIHDMITable** | | |
| **Object** | **OCHD2** | **Access** |
| ocStbHostDVIHDMIOutputType | M | RO |
| ocStbHostDVIHDMIConnectionStatus | M | RO |
| ocStbHostDVIHDMIRepeaterStatus | M | RO |
| ocStbHostDVIHDMIVideoXmissionStatus | M | RO |
| ocStbHostDVIHDMIHDCPStatus | M | RO |
| ocStbHostDVIHDMIVideoMuteStatus | M | RO |
| ocStbHostDVIHDMIOutputFormat | M | RO |
| ocStbHostDVIHDMIAspectRatio | M | RO |
| ocStbHostDVIHDMIAudioFormat | M | RO |
| ocStbHostDVIHDMIAudioSampleRate | M | RO |
| ocStbHostDVIHDMAudioChannelCount | M | RO |
| ocStbHostDVIHDMIAudioMuteStatus | M | RO |
| | | |
| **ocStbHostComponentVideoTable** | | |
| **Object** | **OCHD2** | **Access** |
| ocStbHostComponentVideoConstrainedStatus | M | RO |
| ocStbHostComponentOutputFormat | M | RO |
| ocStbHostComponentAspectRatio | M | RO |
| ocStbHostComponentVideoMuteStatus | M | RO |

FIG. 3C

| ocStbHostRFChannelOutTable | | |
|---|---|---|
| **Object** | **OCHD2** | **Access** |
| ocStbHostRFChannelOut | M | RO |
| ocStbHostRFChannelOutAudioMuteStatus | M | RO |
| ocStbHostRFChannelOutVideoMuteStatus | M | RO |
| | | |
| **ocStbHostInBandTunerTable** | | |
| **Object** | **OCHD2** | **Access** |
| ocStbHostInBandTunerModulationMode | M | RO |
| ocStbHostInBandTunerFrequency | M | RO |
| ocStbHostInBandTunerInterleaver | M | RO |
| ocStbHostInBandTunerPower | M | RO |
| ocStbHostInBandTunerAGCValue | M | RO |
| ocStbHostInBandTunerSNRValue | M | RO |
| ocStbHostInBandTunerUnerroreds | M | RO |
| ocStbHostInBandTunerCorrecteds | M | RO |
| ocStbHostInBandTunerUncorrectables | M | RO |
| ocStbHostInBandTunerCarrierLockLost | M | RO |
| ocStbHostInBandTunerPCRErrors | M | RO |
| ocStbHostInBandTunerPTSErrors | M | RO |
| | | |
| **ocStbHostProgramStatusTable** | | |
| **Object** | **OCHD2** | **Access** |
| | | |
| ocStbHostProgramIndex | M | N-Acc |
| ocStbHostProgramAVSource | M | RO |
| ocStbHostProgramAVDestination | M | RO |
| ocStbHostProgramContentSource | M | RO |
| ocStbHostProgramContentDestination | M | RO |
| | | |

FIG. 3D

| **ocStbHostMpeg2ContentTable** | | |
|---|---|---|
| **Object** | **OCHD2** | **Access** |
| ocStbHostMpeg2ContentIndex | M | N-Acc |
| ocStbHostMpeg2ContentProgramNumber | M | RO |
| ocStbHostMpeg2ContentTransportStreamID | M | RO |
| ocStbHostMpeg2ContentTotalStreams | M | RO |
| ocStbHostMpeg2ContentSelectedVideoPID | M | RO |
| ocStbHostMpeg2ContentSelectedAudioPID | M | RO |
| ocStbHostMpeg2ContentOtherAudioPIDs | M | RO |
| ocStbHostMpeg2ContentCCIValue | M | RO |
| ocStbHostMpeg2ContentAPSValue | M | RO |
| ocStbHostMpeg2ContentCITStatus | M | RO |
| ocStbHostMpeg2ContentBroadcastFlagStatus | M | RO |
| ocStbHostMpeg2ContentEPNStatus | M | RO |
| | | |
| **ocStbHostAnalogVideoTable** | | |
| **Object** | **OCHD2** | **Access** |
| ocStbHostAnalogVideoProtectionStatus | M | RO |
| | | |
| **ocStbHostSPDIfTable** | | |
| **Object** | **OCHD2** | **Access** |
| ocStbHostSPDIfAudioFormat | M | RO |
| ocStbHostSPDIfAudioMuteStatus | M | RO |
| | | |
| **ocStbHostEasObjects** | | |
| **Object** | **OCHD2** | **Access** |
| ocStbEasMessageStateCode | M | RO |
| ocStbEasMessageCountyCode | M | RO |
| ocStbEasMessageCountySubdivisionCode | M | RO |

FIG. 3E

| ocStbHostDeviceSoftware | | |
|---|---|---|
| **Object** | **OCHD2** | **Access** |
| ocStbHostSoftwareVersion | M | RO |
| ocStbHostSoftwareOCAPVersion | M | RO |
| | | |
| **ocStbHostSoftwareDownloadStatus** | | |
| **Object** | **OCHD2** | **Access** |
| ocStbHostSoftwareImageStatus | M | RO |
| ocStbHostSoftwareCodeDownloadStatus | M | RO |
| ocStbHostSoftwareCodeObjectName | M | RO |
| | | |
| **ocStbHostSecuritySubSystem** | | |
| **Object** | **OCHD2** | **Access** |
| ocStbHostSecurityIdentifier | M | RO |
| ocStbHostCASystemIdentifier | M | RO |
| ocStbHostCAType | M | RO |
| | | |
| **ocStbHostPower** | | |
| **Object** | **OCHD2** | **Access** |
| ocStbHostPowerStatus | M | RO |
| ocStbHostAcOutletStatus | M | RO |
| | | |
| **ocStbHostUserSettings** | | |
| **Object** | **OCHD2** | **Access** |
| ocStbHostUserSettingsPreferedLanguage | M | RO |
| | | |
| **ocStbHostAcSwitch** | | |
| **Object** | **OCHD2** | **Access** |
| ocStbHostAcSwitchStatus | M | RO |

FIG. 5

| ocStbHostMemory | | |
|---|---|---|
| **Object** | **OCHD2** | **Access** |
| ocStbHostTotalVolatileMemorySize | M | RO |
| ocStbHostCurrentAvailableVolatileMemorySize | M | RO |
| ocStbHostLargestAvailableVolatileMemorySize | M | RO |
| ocStbHostTotalNonvolatileMemorySize | M | RO |
| ocStbHostCurrentAvailableNonvolatileMemorySize | M | RO |
| ocStbHostLargestAvailableNonvolatileMemorySize | M | RO |

FIG. 6A

```
--
-- Memory Object
--
ocStbHostTotalVolatileMemorySize OBJECT-TYPE
    SYNTAX Unsigned32      <- a1
    UNITS "Kbytes"         <- b1
    MAX-ACCESS read-only    <- c1
    STATUS current         <- d1
    DESCRIPTION            <- e1
        "Total volatile memory size for the Application
         in the Host device."
  ::= { ocStbHostMemory 1 } <- f1

ocStbHostCurrentAvailableVolatileMemorySize OBJECT-TYPE
    SYNTAX Unsigned32
    UNITS "Kbytes"
    MAX-ACCESS read-only
    STATUS current
    DESCRIPTION
        "Current available memory size of the volatile memory
        for the Application in the Host device."
  ::= { ocStbHostMemory 2 } <- f2

ocStbHostLargestAvailableVolatileMemorySize OBJECT-TYPE
    SYNTAX Unsigned32
    UNITS "Kbytes"
    MAX-ACCESS read-only
    STATUS current
    DESCRIPTION
        "The largest volatile memory size of the volatile memory
         for the Application in the Host device."
  ::= { ocStbHostMemory 3 }
```

FIG. 6B

```
ocStbHostTotalNonvolatileMemorySize OBJECT-TYPE
    SYNTAX Unsigned32
    UNITS "Kbytes"
    MAX-ACCESS read-only
    STATUS current
    DESCRIPTION
        "Total non-volatile memory size for the Application
         in the Host device."
  ::= { ocStbHostMemory 4 }

ocStbHostCurrentAvailableNonvolatileMemorySize OBJECT-TYPE
    SYNTAX Unsigned32
    UNITS "Kbytes"
    MAX-ACCESS read-only
    STATUS current
    DESCRIPTION
        "Current available memory size of the non-volatile memory
        for the Application in the Host device."
  ::= { ocStbHostMemory 5 }

ocStbHostLargestAvailableNonvolatileMemorySize OBJECT-TYPE
    SYNTAX Unsigned32
    UNITS "Kbytes"
    MAX-ACCESS read-only
    STATUS current
    DESCRIPTION
        "The Largest memory size of the non-volatile memory
        for the Application in the Host device."
  ::= { ocStbHostMemory 6 }
```

FIG. 8

| ocStbHostMemory | | |
|---|---|---|
| Object | OCHD2 | Access |
| ocStbHostDRAMSize | M | RO |
| ocStbHostSRAMSize | M | RO |
| ocStbHostFlashSize | M | RO |
| ocStbHostNVMSize | M | RO |
| ocStbHostHardDriveSize | M | RO |

FIG. 9A

```
--
-- Memory Object
--
ocStbHostDRAMSize OBJECT-TYPE
    SYNTAX Unsigned32          <- a1
    UNITS "Kbytes"             <- b1
    MAX-ACCESS read-only        <- c1
    STATUS current             <- d1
    DESCRIPTION               <- e1
        "Total DRAM memory size for the Application in the Host
device."
  ::= { ocStbHostMemory 1 }   <- f1

ocStbHostSRAMSize OBJECT-TYPE
    SYNTAX Unsigned32
    UNITS "Kbytes"
    MAX-ACCESS read-only
    STATUS current
    DESCRIPTION
        "Total SRAM memory size for the Application in the Host
device."
  ::= { ocStbHostMemory 2 }   <- f2

ocStbHostFlashSize OBJECT-TYPE
    SYNTAX Unsigned32
    UNITS "Kbytes"
    MAX-ACCESS read-only
    STATUS current
    DESCRIPTION
        "Total Flash memory size for the Application in the Host
device."
  ::= { ocStbHostMemory 3 }
```

FIG. 9B

```
ocStbHostNVMSize OBJECT-TYPE
    SYNTAX Unsigned32
    UNITS "Kbytes"
    MAX-ACCESS read-only
    STATUS current
    DESCRIPTION
        "Total NVM memory size for the Application in the Host device."
   ::= { ocStbHostMemory 4 }

ocStbHostHardDriveSize OBJECT-TYPE
    SYNTAX Unsigned32
    UNITS "Kbytes"
    MAX-ACCESS read-only
    STATUS current
    DESCRIPTION
        "Total Hard Drive size for the Application in the Host device."
   ::= { ocStbHostMemory 5 }
```

BROADCAST RECEIVING APPARATUS, APPLICATION TRANSMITTING/RECEIVING METHOD AND RECEPTION STATUS INFORMATION TRANSMITTING METHOD

This application claims the benefit of the Korean Patent Application No. 10-2006-0024859, filed on Mar. 17, 2006, which is hereby incorporated by reference as if fully set forth herein.

BACKGROUND OF THE INVENTION

1. Field of the Invention

The present invention relates to a broadcast receiving apparatus, application transmitting/receiving method, and reception status information transmitting method.

2. Discussion of the Related Art

Generally, broadcast systems used to transmit/receive broadcast programs are turning into bi-directional or interactive broadcast systems according to the advent of the data broadcast concept.

In this case, the bi-directional broadcast system includes a function of enabling a viewer or broadcast receiver to transmit information associated with a received broadcast or a broadcast to be received to a broadcast transmitting side.

The cable broadcast receiver is able to receive various applications from a broadcast transmitting side as well as a broadcast. In this case, the application means a program or codes capable of implementing a prescribed function in a prescribed receiving terminal or an implementation function conceptionally implemented by a prescribed program or codes.

However, in case that a broadcast transmitting terminal transmits plenty of applications to a broadcast receiver, it is unable to know a reception status of the broadcast receiver. So, it is unable to recognize whether a problem occurs or not in case that the broadcast receiver receives the corresponding application.

Moreover, if a volume of an application received by a broadcast receiver exceeds an available capacity of a storage device connected to the broadcast receiver, the broadcast receiver has difficulty in storing or implementing the received application.

SUMMARY OF THE INVENTION

Accordingly, the present invention is directed to a broadcast receiving apparatus, application transmitting/receiving method, and reception status information transmitting method that substantially obviate one or more problems due to limitations and disadvantages of the related art.

An object of the present invention is to provide a broadcast receiving apparatus, application transmitting/receiving method, and reception status information transmitting method, by which information associated with a broadcast reception status can be transmitted to a broadcast transmitting terminal.

Another object of the present invention is to provide a broadcast receiving apparatus, application transmitting/receiving method, reception status information transmitting method, and data structure of reception status information, by which a problem of a storage device can be transmitted to a broadcast transmitting terminal in advance in case of attempting to receive an application or the like that will be transmitted by the broadcast transmitting terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a reception status information, in which the reception status information is transmitted by a broadcast receiver having a storage device capable of storing an application, the method including collecting information indicating a remaining size of the storage device of the broadcast receiver and transmitting the collected information according to a network management protocol.

In another aspect of the present invention, a method of receiving an application, which is received by a broadcast receiver having a storage device from a broadcast transmitting terminal, the method including transmitting information indicating a remaining size of the storage device according to a network management protocol and receiving the application according to the information indicating the remaining size of the storage device.

In another aspect of the present invention, a method of transmitting an application, which is transmitted by a broadcast transmitting terminal to a broadcast receiver having a storage device, the method including requesting information indicating a remaining size of the storage device according to a network management protocol at the broadcast transmitting terminal, collecting the information indicating the remaining size of the storage device at the broadcast receiver, transmitting the collected information according to the network management protocol at the broadcast receiver, receiving the information indicating the remaining size at the broadcast receiver and transmitting the application according to the information indicating the remaining size at the broadcast transmitting terminal.

In another aspect of the present invention, an apparatus for receiving a broadcast, the apparatus connected to a network for receiving an application, the apparatus including a storage device storing the received application, a storage device control unit outputting information indicating a remaining size of the storage device and a control unit converting the information indicating the remaining size outputted by the storage device control unit to data according to a network management protocol, and transmitting the converted information to the network.

The network management protocol may be a simple network management protocol (SNMP). The remaining size can be a size of an available size of the storage device. If there is a previously received and stored application in the storage device, the remaining size is a total of an unused size of the storage device and a storage size of the stored application.

The broadcast receiving apparatus may replace the previously stored application by the received application. The collected information is defined as MIB (management information base) data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A to 3E are diagrams for examples of various kinds of status information that a host can transmit to a cable headend using SNMP;

FIG. 5 is a diagram for an example of a data structure of reception status information according to an embodiment of the present invention;

FIG. 6A and FIG. 6B are diagrams for an example of SMI syntax that defines the example shown in FIG. 5 as an MIB data structure;

FIG. 8 is a diagram for another example of a data structure of reception status information according to the present invention;

FIG. 9A and FIG. 9B are diagrams for an example of SMI syntax that defines the example shown in FIG. 8 as an MIB data structure;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
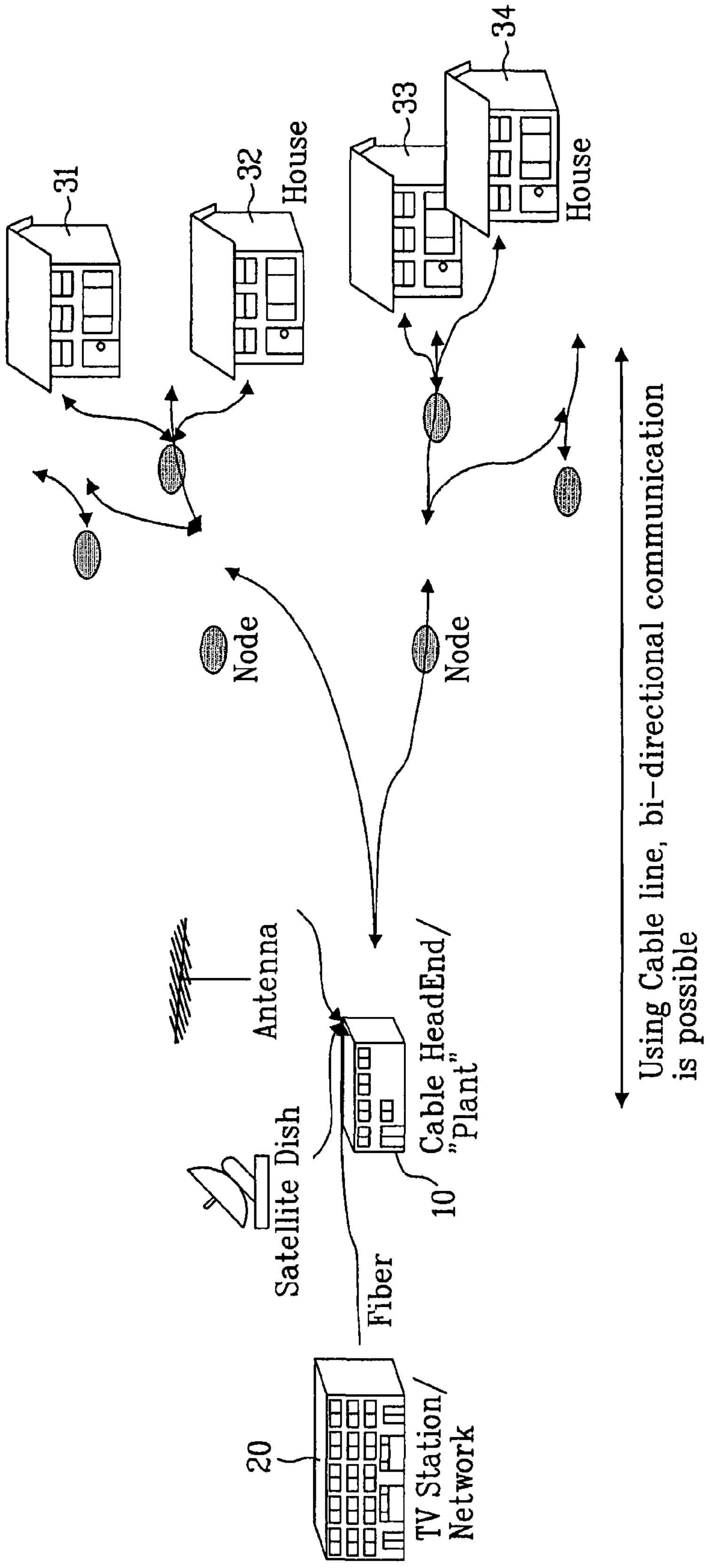
FIG. 1 is a diagram of a cable broadcast network including a broadcast host and a cable card as an example for a bi-directional broadcast system.

FIG. 1 is a conceptional diagram of a cable broadcast network including a broadcast host and a cable card as an example for a bi-directional broadcast system.

Referring to FIG. 1, a cable headend 10 or a plant 10 is capable of receiving broadcast signals via various communication networks from a television broadcasting station 20. The cable headend 10 is able to transmit a received cable broadcast to a plurality of hosts 31 to 34 of cable broadcast receivers via a network including a plurality of nodes. And, the host 31, 32, 33 or 34 or a cable card is able to receive/transmit a signal from the cable headend 20 via a cable network capable of transmitting data bi-directionally.

And, each of the hosts 31 to 34 can be connected other peripheral devices (e.g., digital television set, DVD player, digital camcorder, set-top box, etc.) through various kinds of interfaces.

A broadcast receiving apparatus, application transmitting/receiving method, and reception status information transmitting method according to the present invention provide information indicating a reception status of the broadcast receiving apparatus to a transmitting terminal using a network management protocol. And, the broadcast transmitting terminal is able to transmit the application using the information associated with the reception status.

There are various kinds of network management protocols. To facilitate the explanation of the embodiments of the present invention, a simple network management protocol (hereinafter abbreviated SNMP) is taken as an example. The SNMP is a network associated protocol used to previously prevent technical difficulties from occurring by various factors such as network traffic overload and the like or to effectively perform factor examination of the difficulties and recovery works.

Hence, it is able to use SNMP for basic network managements. And, it is also able to use the SNMP to remotely recognize real-time states of various devices connected to a network.

Figure 2:
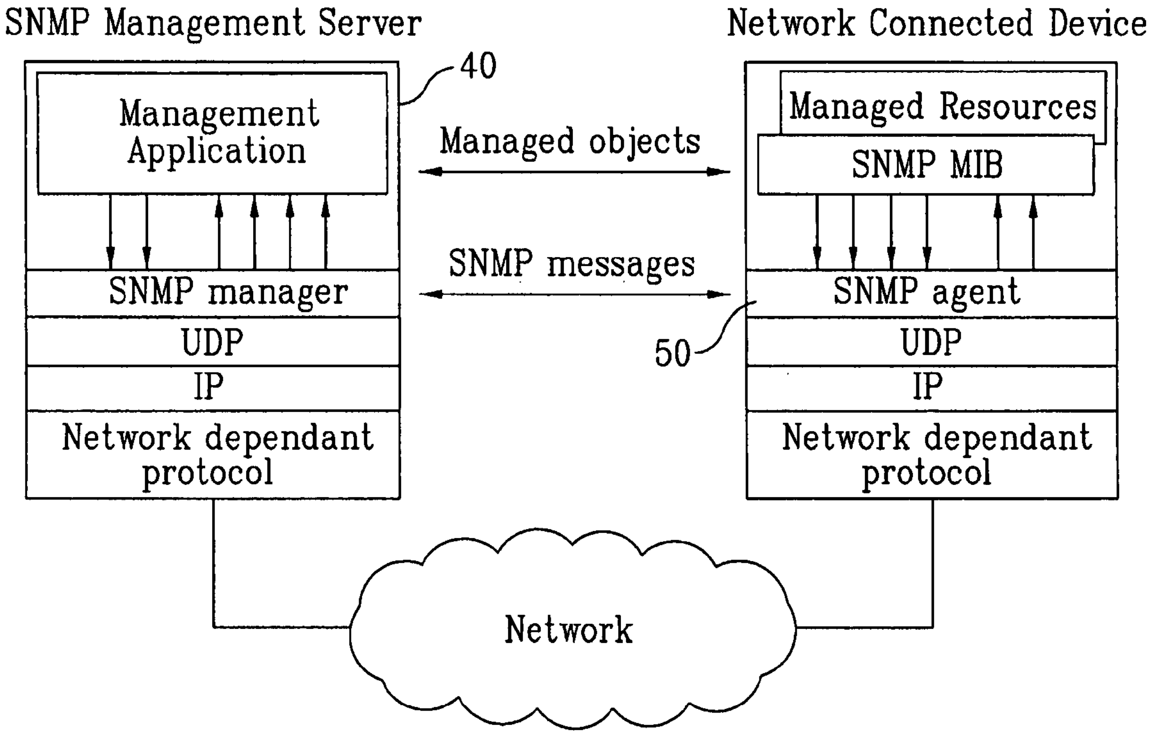
FIG. 2 is a conceptional diagram for information exchange between an SNMP management server and an SNMP agent.

FIG. 2 is a conceptional diagram for information exchange between an SNMP management server and an SNMP agent. A concept of SNMP is explained to facilitate the understanding of the present invention.

Referring to FIG. 2, an SNMP is usable for all kinds of network environments that use TCP/IP (transmission control protocol/internet protocol). An SNMP management server 40 can be connected to various network connected devices 50 via wire/wireless network. The SNMP management server 40 may correspond to a broadcast transmitting terminal that transmits a broadcast. And, the network connected device 50 may correspond to a broadcast receiver.

In case of attempting to transmit an application, the SNMP management server 40 is able to obtain reception status information in a manner of making a request for the reception status information to the device 50 using an SNMP manager. In this case, a request or response for the reception status information is transformed by such a TCP/IP as UDP (user datagram protocol) and IP (internet protocol) and is then transmitted via a network dependent protocol of a physical layer.

The network connected device 50 is able to receive the transmitted reception status information request and transmit the reception status information according to a predetermined format. The network connected device 50 attempting to transmit the status information to the SNMP management server 40 is able to transmit the reception status information as a standardized data structure called a management information base (hereinafter abbreviated MIB).

For this, a broadcast receiver receiving an application can be provided with an SNMP agent to transmit various kinds of status information represented as the data structure to an SNMP management server in a remote place. In this case, the SNMP agent is the general term for a device or application that is capable of interfacing the MIB data with such a network associated protocol as UDP/IP.

In the following description, a cable broadcasting system is taken as an example to explain the present invention. In the cable broadcasting system, a broadcast transmitting terminal is a cable headend, a broadcast receiver is a host or a cable broadcast receiver, and a network is a cable broadcasting network.

Yet, the present invention is not limited to the cable broadcasting system only. The technical idea of the present invention is applicable to a broadcasting system capable of bi-directional broadcasting. To facilitate the understanding of the present invention, the idea of the present invention is explained with reference to the cable broadcasting system as follows.

FIGS. 3A to 3E are diagrams for examples of various kinds of status information that a host can transmit to a cable headend using SNMP.

The status information shown in FIGS. 3A to 3E can be transmitted as the MIB data structure. FIGS. 3A to 3E illustrate the information defined as MIB data. For convenience, the information is divided to be represented as FIGS. 3A to 3E. In the example shown in FIG. 3A, 'ocstbHostHWIdentifiers' indicates a unique number of a host product and 'ocstbHostAVInterfaceTable' indicates interface information of a host. And, 'ocstbHostIEEE1394Table' indicates information of a connected status or the like in case that a host is connected by IEEE 1394.

In FIG. 3B, 'ocstbHostIEEE1394ConnectedDevicesTable' indicates information of a device connected by IEEE 1394. And, 'ocstbHostDVIHDMITable' indicates status information in case that there is an input to a host according to DVI (digital video interactive) or HDMI (high definition multimedia interface).

In FIG. 3C, 'ocstbHostRFChannelOutTable' indicates information indicating whether a host enables to output an RF signal, 'ocstbHostInBandTunerTable' indicates information associated with an RF channel frequency of a tuner of a host, and 'ocstbHostProgramStatusTable' indicates information associated with input/output of a currently received broadcast stream.

The object identifiers enumerated in FIG. 3D and FIG. 3E are examples for the status informations associated with the cable broadcast receiver. And, each of the object identifiers can be defined as an MIB data structure as well.

Besides, 'M' in FIGS. 3A to 3E indicates a mandatory item regulated by the specifications relating to the MIB data of cable broadcasting. And, 'RO' indicates that a cable headend has an access right (read-only) to corresponding status information of the cable broadcast receiver only. Moreover, 'N-Acc' indicates that the cable headend is not accessible to the corresponding status information. Thus, the cable broadcast receiver defines the MIB data structure and is able to transmit the above-enumerated information as MIB data by SNMP system to the cable headend.

In aspect of describing the MIB data structure, the cable headend is able to play a role as an SNMP management server and the cable broadcast receiver is able to play a role as an SNMP agent. The concepts of the communications between the SNMP management server, the SNMP agent and the like with various objects can be classified into three types.

Figure 4A:
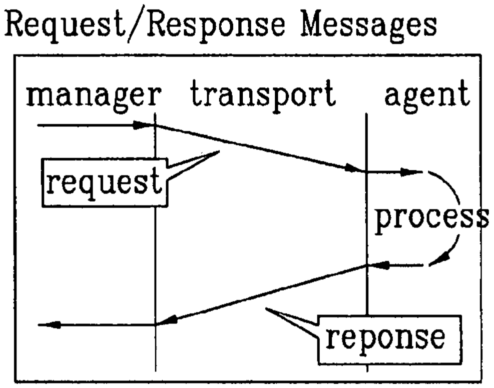
FIGS. 4A to 4C are conceptional diagrams for communications defined by SNMP system.
Figure 4B:
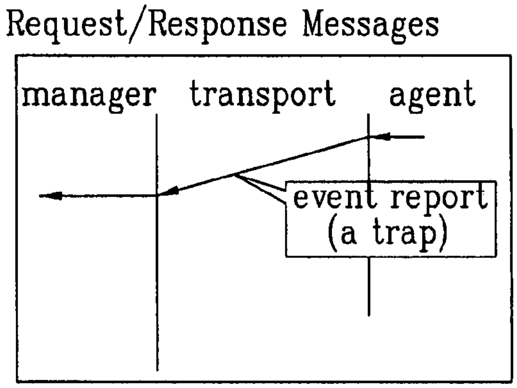
Figure 4C:
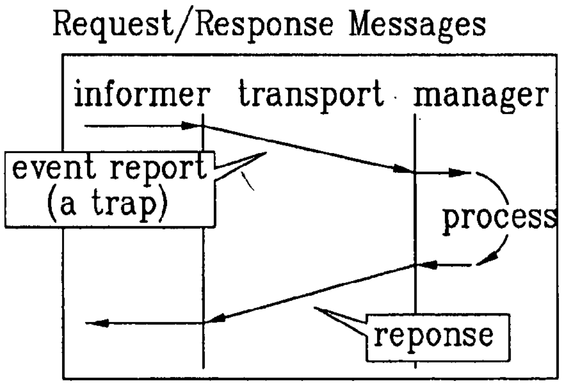

FIGS. 4A to 4C are conceptional diagrams for communications defined by SNMP system. The communication concepts defined by SNMP are explained with reference to FIGS. 4A to 4C as follows.

FIG. 4A shows a first concept for a management server to receive information from an agent. Referring to FIG. 4A, a management server is able to obtain status information of a corresponding device via an agent (Get Operation) or set a specific value of status information (Set Operation). If a management server makes a request for specific information, an agent is able to recognize whether a corresponding object is managed by the agent itself and make a corresponding response.

FIG. 4B shows a second concept for a management server to communicate with an agent. Referring to FIG. 4B, in case that there is an event taking place in a corresponding device, an agent is able to notify status information associated with the event (Trap Operation). A management server receives the status information and enables a processing fitting the device to be performed.

SNMP defines an informer that is another object as well as a management server. FIG. 4C shows a third concept for communications between an informer and a management server. Referring to FIG. 4C, an informer reports a prescribed event to a management server (Event Report). The management is then able to transmit a response relating to the event to the informer.

In the above-explained communication methods according to SNMP, if a host defines an SNMP agent and an MIB data structure, the host is able to transmit specific status information at a timing point when a management server makes a request. Considering a cable broadcasting system, a cable broadcast receiver receives and stores various applications including EPG and the like via a cable network from a cable broadcast headend and is able to implement the corresponding applications.

In order for a cable broadcast receiver as a host to implement an application received from a cable headend, it is provided with a capacity for storing an application to be received or a memory capacity for implementing the application.

In case of attempting to transmit an application to a cable broadcast receiver, a cable headend receives status information associated with a storage capacity of the cable broadcast receiver from the cable broadcast receiver in advance and then transmits the application according to a result of the reception.

A cable headend is able to transmit a full version of an application code image to a cable broadcast receiver provided with sufficient storage availability. One application can be provided with various versions. So, the full version of the application code image means a version capable of implementing all function of a prepared application.

If a cable broadcast receiver fails to be provided with a storage capacity for driving an application to be transmitted, a cable headend prepares a light-weight version of an application code image to be transmitted and then transmits the prepared version. In this case, the cable headend is able to transmit the application with a size enough for the cable broadcast receiver to receive and implement the corresponding application.

In this case, the application of the light-weight version corresponds to a concept including an application that enables functions of the full version application to be implemented in part or is implemented as a graphic image of low resolution, when the application is implemented by the broadcast receiver.

FIG. 5 is a diagram for an example of a data structure of reception status information according to the present invention. A data structure of reception status information and a method of transmitting the reception status information according to one embodiment of the present invention are explained with reference to FIG. 5 as follows.

In a reception status information transmitting method according to the present invention, it is able to transmit reception status information of a storage device using SNMP. For the reception status information transmitting method according to the present invention, it is able to define an MIB data structure like status informations (object identifiers) of SNMP explained in FIGS. 3A to 3E.

FIG. 5 shows an example of an MIB data structure that can be defined by a cable broadcast receiver and enables a storage capacity associated with the receiver to be confirmed. For the facilitation of the explanation, it is assumed that a cable headend is provided with an SNMP management server and that a cable broadcast receiver is able to play a role as an SNMP agent.

Status information indicating a storage capacity of a cable broadcast receiver can include information indicating a total size of volatile memory (represented as ocStHostTotalVolatileMemorySize), information indicating a total size of currently available volatile memory (represented as ocStHostCurrentAvailableVolatileMemorySize), and information indicating a largest volatile memory size in a total size of consecutive volatile memory (represented as ocStHostLargestAvailableVolatileMemorySize). And, status information for a storage capacity of a cable broadcast receiver can include information indicating a total size of nonvolatile memory (represented as ocStHostTotalNonvolatileMemorySize), information indicating a total size of currently available nonvolatile memory (represented as ocStHostCurrentAvailableNonvolatileMemorySize), and information indicating a largest nonvolatile memory size in a total size of consecutive nonvolatile memory (represented as ocStHostLargestAvailableNonvolatileMemorySize).

The information indicating the total size of the volatile memory (ocStHostTotalVolatileMemorySize) indicates a total size of the volatile memory enabling a broadcast receiver to execute an application. And, a unit can be defined as kilobytes.

The information indicating the total size of the currently available volatile memory (represented as ocStHostCurrentAvailableVolatileMemorySize) indicates a size of the available volatile memory secured for an application by a cable broadcast receiver. So, the information indicating the total size of the currently available volatile memory indicates a size resulting from subtracting a size of already-used volatile memory from a total size of the volatile memory.

An SNMP management server makes a request for status information to an SNMP agent (Request Message). If the SNMP agent transmits status information indicating a total size of currently available volatile memory to the SNMP management server at the timing point of making the request, the SNMP management server is able to get the status information (Get Operation).

The information (ocStHostLargestAvailable VolatileMemorySize) indicating the total size of the largest volatile memory in the consecutive volatile memory indicates a maximum size of the consecutive volatile memory secured for an application by the cable broadcast receiver.

If a use of the volatile memory is dispersed to cause memory fragmentation, the SNMP agent is able to transmit the status information for the consecutive volatile memory size by considering the memory fragmentation. If so, the SNMP management server is able to transmit an application fitting the size based on the largest size of the consecutive memory.

The information indicating the total size of the nonvolatile memory (ocStHostTotalNonvolatileMemorySize) indicates a total size of the nonvolatile memory secure by a broadcast receiver for an application. And, a unit can be defined as kilobytes for example.

The information indicating the total size of the currently available nonvolatile memory (represented as ocStHostCurrentAvailableNonvolatileMemorySize) indicates a size of the available nonvolatile memory secured for an application by a cable broadcast receiver. So, the information for the total size of the currently available nonvolatile memory indicates a size resulting from subtracting a size of already-used nonvolatile memory from a total size of the nonvolatile memory.

A method of transmitting the information indicating a total size of the currently available nonvolatile memory from an SNMP agent is the same of the method of transmitting the information indicating a total size of the currently available volatile memory.

The information (ocStHostLargestAvailable NonvolatileMemorySize) indicating the total size of the largest nonvolatile memory in the consecutive nonvolatile memory indicates a maximum size of the consecutive nonvolatile memory secured for an application by the cable broadcast receiver.

If a use of the nonvolatile memory is dispersed to cause memory fragmentation, the SNMP agent is able to transmit the status information indicating the consecutive nonvolatile memory size by considering the memory fragmentation.

Hence, if a cable headend is provided with an SNMP management server, status information for a storage device of a cable broadcast receiver provided with an SNMP agent can be transmitted or received through the above-explained MIB data. The memory size of the storage device may includes information indicating a memory size secured by a broadcast receiver to receive an application from a broadcast transmitting terminal among the entire size of the storage device.

FIG. 6A and FIG. 6B are diagrams for an example of SMI (structure of management information) syntax that defines the example shown in FIG. 5 as an MIB data structure. And, FIG. 6A and FIG. 6B illustrates a continuous syntax for convenience of explanation.

Status informations of SNMP can be defined as objects of MIB data structure using SMI (structure of management information) syntax. A data structure of reception status information according to the present invention is explained with reference to FIG. 6A and FIG. 6B as follows.

First of all, a type of 'ocStHostTotalVolatile MemorySize' indicating information of a total size of volatile memory can be represented as 32 bits (a1). A unit of this information can be represented as kilobytes (b1). And, an access right of the information to an object identifier can be 'read-write'. An access right of the information to an object identifier can be defined as 'read-only' (c1). It is able to define that a value for a current status is transmitted (d1). And, an explanation for the data can be given (e1). The information indicating the total size of the volatile memory can be located at another position within an MIB structure. The information indicating the total size of the volatile memory is included in a data structure (ocStHostMemory) indicating a memory status of a broadcast receiver.

The example shown in FIG. 6A and FIG. 6B indicates that the information of the total size of the volatile memory is located as a first data of the data structure (ocStHostMemory) indicating the memory status of the broadcast receiver.

The 'ocStHostCurrentAvailableVolatileMemorySize' indicating the information of a total size a currently available volatile memory can be defined in a manner similar to that of the above-explained information indicating the total size of the volatile memory. Yet, the example shown in FIG. 6A and FIG. 6B indicates that the information of the total size of the currently available volatile memory is located at a second data position of the data structure (ocStHostMemory) indicating the memory status of the broadcast receiver (f2).

In the example shown in FIG. 6A and FIG. 6B, the information (ocStHostLargestAvailableVolatileMemorySize) for the total size of the largest volatile memory size of the consecutive volatile memory, the information (ocStHostTotalNonvolatileMemorySize) for the total size of the nonvolatile memory, the information (ocStHostCurrentAvailableNonvolatileMemorySize) for the total size of the currently available nonvolatile memory, and the information (ocStHost- LargestAvailableNonvolatileMemorySize) for the largest memory size of the consecutive nonvolatile memory are located at third, fourth, fifth and sixth data of the data structure (ocStHostMemory) indicating the memory status of the broadcast receiver, respectively.

Figure 7:
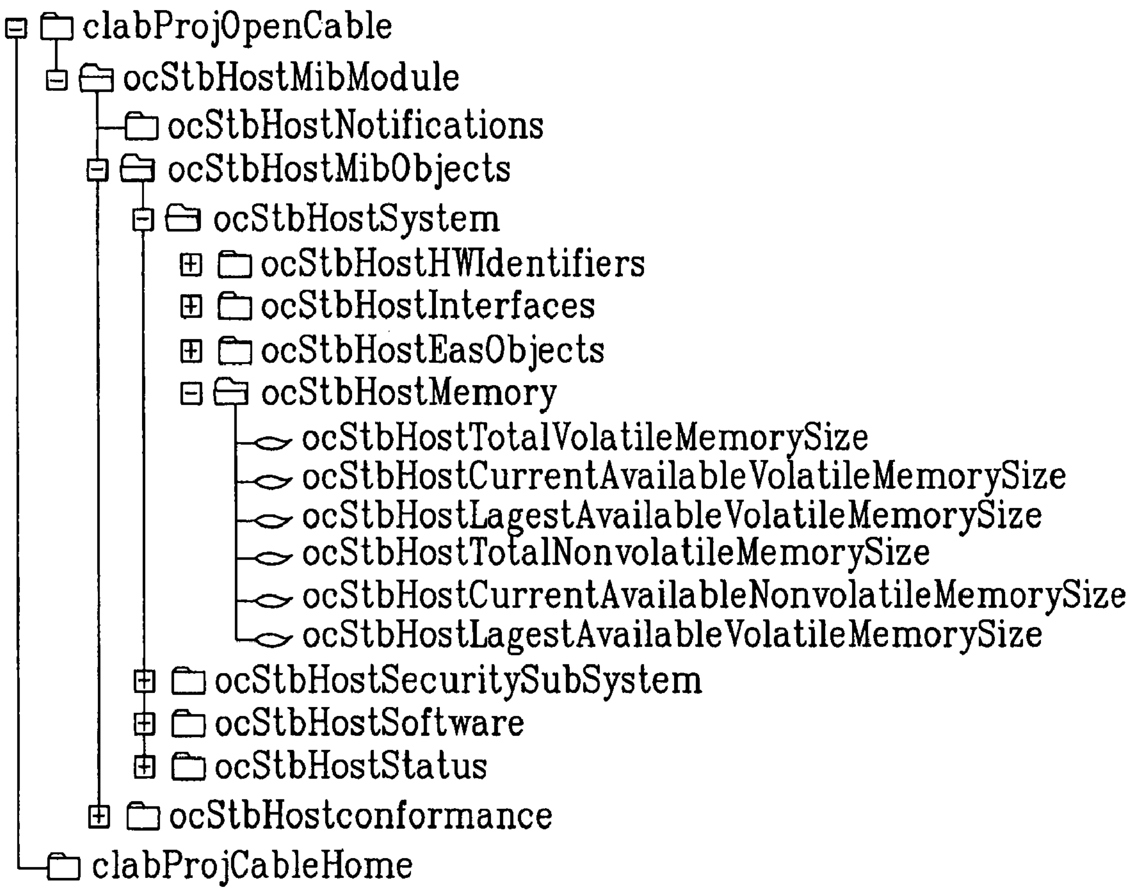
FIG. 7 is a diagram for an example of graphically implementing a result of registering the data structure defined according to the example shown in FIG. 6A and FIG. 6B to an SNMP management server.

FIG. 7 is a diagram for an example of graphically implementing a result of registering the data structure defined according to the example shown in FIG. 6A and FIG. 6B to an SNMP management server. In the example shown in FIG. 7, a data type for each memory information is defined as an unsigned32 data type. An SNMP management server is able to monitor a real-time memory status of a broadcast receiver in a remote place by registering objects indicating the respective informations to a data structure (ocStHostMemory) indicating a memory status.

Meanwhile, an application of light-weight version may have a compatibility with an application of full version. If there exists compatibility, a cable broadcast receiver is able to update an application from a cable headend according to each version. And, the cable broadcast receiver is able to replace a currently owned application by a higher-version application.

If a cable broadcast receiver fails to be provided with a storage size for driving an application, a cable headend is able to transmit a light-weight-version application having a size enough for the cable broadcast receiver to receive and implement an application. If a size of a consecutive volatile or nonvolatile memory is not large enough to receive a full-version application, the cable headend may transmits a light-weight-version application fitting the consecutive volatile or nonvolatile memory size. The cable broadcast receiver, which is driving an application, is able to receive a higher-version application of the driven application according to a size available for a storage device.

FIG. 8 is a diagram for another example of a data structure of reception status information according to the present invention. A method of transmitting reception status information and a reception status data structure according to another embodiment of the present invention are explained with reference to FIG. 8 as follows.

A cable broadcast receiver defines information (ocStbHostDRAMSize) for a DRAM (dynamic random access memory) size secured to receive or implement an application in an MIB data structure and is then able to transmit the information. And, a unit for the size can be a kilobyte for example. A cable broadcast receiver defines information (ocStbHostSRAMSize) for an SRAM (static random access memory) size secured to receive or implement an application in an MIB data structure and is then able to transmit the information. And, a unit for the size can be a kilobyte for example.

Similarly, a cable broadcast receiver is able to define information (ocStbHostFlashSize) for a size of a flash memory for an application, information (ocStbHostNVMSize) for a size of NVM (nonvolatile memory), or information (ocStbHostHardDriveSize) for a size of a hard disc drive. And, a cable headend enables an application to be normally driven by transmitting the application to a storage device of the cable broadcast receiver according to a capacity of each storage device for the transmission of the cable broadcast receiver.

Since an application of a cable broadcast receiver is updated into or replaced by a higher version, the cable broadcast receiver is able to receive a higher-version application according to a remaining size resulting from having transmitted information indicating the remaining size of a storage device to a cable headend.

FIG. 9A and FIG. 9B are diagrams for an example of SMI syntax that defines the example shown in FIG. 8 as an MIB data structure. Referring to FIG. 9A and FIG. 9B, information indicating a storage size transmitted by a cable broadcast receiver to a cable headend includes information (ocStbHostDRAMSize) for a size of DRAM (dynamic random access memory), information (ocStbHostSRAMSize) for a size of SRAM (static random access memory), information (ocStbHostFlashSize) for a size of flash memory, information (ocStbHostNVMSize) for a size of NVM (nonvolatile memory), or information (ocStbHostHardDriveSize) for a size of hard disk drive.

A type of ‘ocStbHostDRAMSize’ indicating information of a DRAM size can be represented as 32 bits (a1). A unit of this information can be represented as kilobytes (b1), and an access right can be defined as ‘read-only’ (c1). A value for a current status is made to be transmitted (d1), and an explanation for the data can be given (e1).

Information indicating a DRMA size secured by a broadcast receiver can be located at any position within an MIB structure of the broadcast receiver. In the example shown in FIG. 9A and FIG. 9B, the information indicating the DRAM size, which is included in a data structure (ocStHostMemory) indicating a memory status of the broadcast receiver, is located at a first data position of the data structure (ocStHostMemory) (f1).

And, information indicating a size of SRMA can be defined in a manner similar to the information indicating the size of the DRAM. In the example shown in FIG. 9A and FIG. 9B, the information for the size of the SRAM is defined as a second data of the data structure (ocStHostMemory) indicating the memory status of the broadcast receiver (f2).

Moreover, information (ocStbHostFlashSize) for a size of flash memory, information (ocStbHostNVMSize) for a size of NVM (nonvolatile memory) and information (ocStbHostHardDriveSize) for a size of hard disc drive can be defined as third, fourth and fifth data of the data structure (ocStHostMemory) indicating the memory status, respectively. If the information of the size of the storage device of the broadcast receiver is defined as the MIB data structure, an SNMP agent of a cable broadcast receiver and an SNMP management server of a cable headend are able to transmit or receive the information of the size according to the defined data format. And, the cable headend is able to transmit an application, which can be accommodated by the storage capacity of the cable broadcast receiver, each time the application is needed. The cable broadcast receiver receives to implement a transmitted application or implements an application in a manner of replacing a lower-version application by a transmitted-version application.

Figure 10:
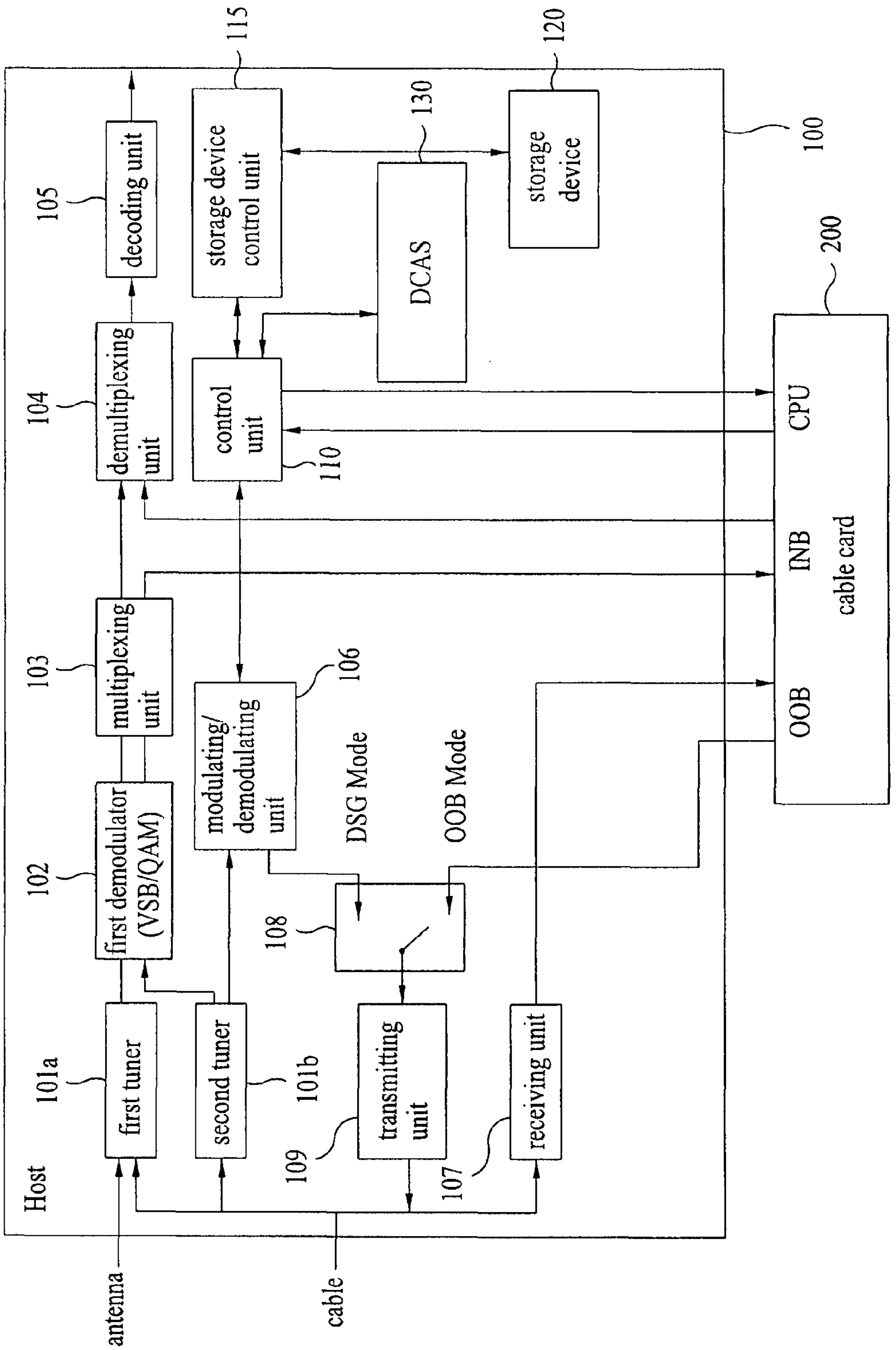
FIG. 10 is a block diagram of a broadcast receiving apparatus according to one embodiment of the present invention.

FIG. 10 is a block diagram of a broadcast receiving apparatus according to one embodiment of the present invention. A broadcast receiving apparatus according to one embodiment of the present invention is explained with reference to FIG. 10 as follows.

Referring to FIG. 10, in case that a broadcast receiving apparatus according to one embodiment of the present invention is a cable broadcast receiver, it can include a host 100 and a cable card 200 loadable to the host 100.

And, the host 100 is capable of receiving a cable broadcast signal only or at least one of a cable broadcast signal, a terrestrial broadcast signal and a satellite broadcast signal. Namely, in the embodiment of the present invention, a case that the host 100 is able to receive signals of at least one of cable broadcasting, terrestrial broadcasting, and satellite broadcasting is taken into consideration.

Meanwhile, in FIG. 10, it is assumed that the cable broadcast receiver enables an OOB (Out Of Band) system and a DSG (DOCSIS Settop Gateway) system as a bi-directional communication system between a cable broadcast receiver and a cable headend. The host is able to receive a broadcast or transmit information to a broadcast transmitting terminal through the above system.

The OOB system is a sort of a specification regulation a transmission protocol between a cable headend and a settop box. On the other hand, the DSG (DOCSIS Settop Gateway) system indicates a transmission system between a cable modem control system of a cable broadcasting station and a DOCSIS based cable modem within a cable broadcast receiver. The DOCSIS is the specification of digital cable televisions adopted by Cablelabs that is the U.S. cable broadcasting standard authentication organization. By this specification, it is able to transmit data using a cable modem. FIG. 10 shows the embodiment of the cable broadcast receiver employing the hybrid system of the OOB and DSG, which is just exemplary.

In the embodiment shown in FIG. 10, the host 100 includes a first tuner 101*a*, a second tuner 101*b*, a demodulating unit 102, a multiplexing unit 103, a demultiplexing unit 104, a decoding unit 105, a modulating/demodulating unit 106, a receiving unit 107, a switching unit 108, a transmitting unit 109, a control unit 110, a storage device control unit 115, and a storage device 120. The first tuner 101*a* tunes a specific channel frequency of terrestrial A/V (audio/video) broadcasting transmitted via an antenna or cable A/V broadcasting transmitted by in-band and the outputs the tuned channel frequency to the first demodulating unit 102.

The terrestrial broadcasting and the cable broadcasting may differ from each other in a transmission system. Yet, the first demodulating unit 102 is capable of performing different modulating processes on signals of different demodulating systems, respectively. FIG. 10 shows an example that a terrestrial A/V broadcast is modulated by VSB (vestigial sideband modulation) to be transmitted and that a cable A/V broadcast is modulated by QAM (quadrature amplitude modulation) to be transmitted. The first demodulating unit 102 performs demodulation of a signal by VSB according to the signal selected by the first tuner 101*a* or performs demodulation of a signal by QAM.

The signal demodulated by the first demodulating unit 102 passes through the multiplexing unit 103 to be multiplexed. So, the cable broadcast is outputted to the cable card 200 and the terrestrial broadcast is outputted to the demultiplexing unit 104. The embodiment shown in FIG. 10 considers a case that the cable card 200 is capable of processing multi-streams. So, the cable card 200 enables the host 100 to display the inputted broadcasts in which at least two streams are multiplexed. The demultiplexing unit 104 receives the multiplexed broadcast signal, separates it into a plurality of streams, and then outputs the streams. The decoding unit 105 decodes the received broadcast signal and then outputs a user-viewable A/V signal. The second tuner 101*b* tunes a specific channel frequency of data broadcasting transmitted by DSG (DOCSIS Settop Gateway) via cable and then outputs the tuned frequency to the modulating/demodulating unit 106. The modulating/demodulating unit 106 demodulates the DSG data broadcast and then outputs the demodulated broadcast signal to the control unit 110. The receiving unit 107 tunes a specific channel frequency for a broadcast signal transmitted by OOB (Out Of Band) via cable and then outputs the tuned frequency to the cable card 200.

In case that bi-directional communications between a cable broadcasting station and the cable broadcast receiver are possible, uplink informations (e.g., pay program request, diagnosis information of host, etc.) transmitted to the cable broadcasting station by the cable broadcast receiver can be transmitted by OOB or DSG. So, the cable broadcast receiver according to one embodiment of the present invention can include the switching unit 108 to transmit information by selecting one of the OOB and the DSG.

A DSG signal is transformed by the modulating/demodulating unit 106 via the control unit 110 of the host according to a network protocol, is selected by the switching unit 108, and is then transmitted via cable. An OOB signal is transmitted to the cable via the transmitting unit 109 through the cable card 200. In the OOB system, user information or system diagnostic information is outputted to the transmitting unit 109 via the cable card 200 and the switching unit 108. The transmitting unit 109 performs signal modulation on the output signal by QPSK modulation or the like and then transmits the modulated signal to the cable broadcasting station via cable.

If user's broadcast associated information is transmitted by DSG, the information is outputted to the transmitting unit 109 via the control unit 110 and the switching unit 108, modulated into a signal by the transmitting unit 109 according to QAM-16 modulation, and then transmitted to the cable broadcasting station via cable.

The storage device 120 is capable of storing a received broadcast or application. The storage device 120 may include a volatile memory or a nonvolatile memory. The storage device control unit 115 is able to calculate a remaining or available size of the storage device 120. For instance, the storage device control unit 115 is able to calculate a size of the storage device 120 using a prescribed program function. In this case, if the storage device control unit 115 pages the function, the function is cable to return a value for the remaining size of the storage device 120. And, the remaining size means the size of the storage device enumerated in FIG. 5 or FIG. 8.

The control unit 110 is able to define the obtained size of the storage device 120 as MIB data by SNMP. For instance, the control unit 110 compiles the SMI codes shown in FIG. 6A and FIG. 6B or in FIG. 9A and FIG. 9B to define the information indicating the size of the storage device as MIB data. For instance, the control unit 110 compiles an MIB document written by SMI to define the size for the storage device defined as the MIB document into object identifiers.

In order to transmit the information defined as the MIB data to the cable headend, the host is able to output the information defined as the MIB data by converting it according to the SNMP. For instance, in order to transmit the data corresponding to the object identifier to the cable headend, the host is able to convert and output the data according to the SNMP. In this case, an SNMP agent can be implemented by a separate device (not shown in the drawing) and the control unit 110 is able to play a role as the SNMP agent. In case that the control unit 110 plays a role of the SNMP agent, the control unit 110 packetizes the object identifier data defined as the MIB data, converts it according to UDP/IP, and then outputs the converted data. For instance, the control unit 110 packetizes the data corresponding to each defined object identifier and then coverts to output the data according to UDP/IP.

In case that the cable headend transmits an encryption algorithm, a downloadable conditional access system (DCAS) 130 is able to receive and operate the encryption algorithm. So, if the host 100 is provided with the DCAS 130, it is able to receive a cable broadcast without the cable card 200. In the one embodiment of the present invention shown in FIG. 10, if a received broadcast is a terrestrial broadcast, the cable card 200 receives a multi-stream broadcast signal from the multiplexing unit 103. If the broadcast signal is scrambled, the cable card 200 descrambles the broadcast signal to enable a cable broadcast to be normally played or recorded.

Figure 11:
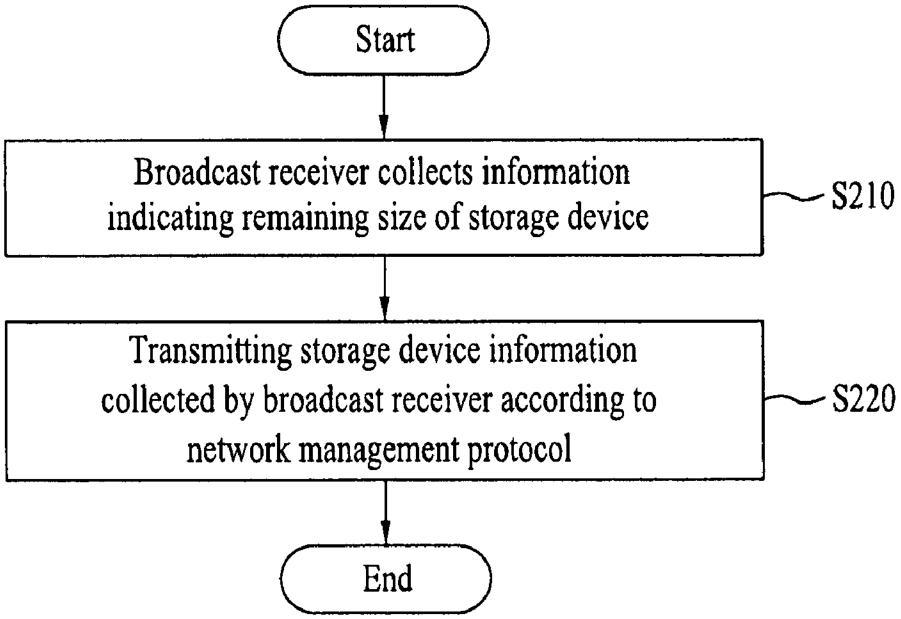
FIG. 11 is a flowchart of a method of transmitting reception status information according to one embodiment of the present invention.

FIG. 11 is a flowchart of a method of transmitting reception status information according to one embodiment of the present invention. Referring to FIG. 11, a method of transmitting reception status information from a broadcast receiver having a storage device capable of storing an application is explained as follows.

First of all, the broadcast receiver collects information indicating a remaining size of the storage device (S210). Secondly, the broadcast receiver transmits the collected information indicating r the reaming size of the storage device according to a network management protocol (S220). In this case, SNMP can be used as the network management protocol. In the embodiment shown in FIG. 11, the information is transmitted according to the trap method among SNMP information transmitting/receiving methods.

Figure 12:
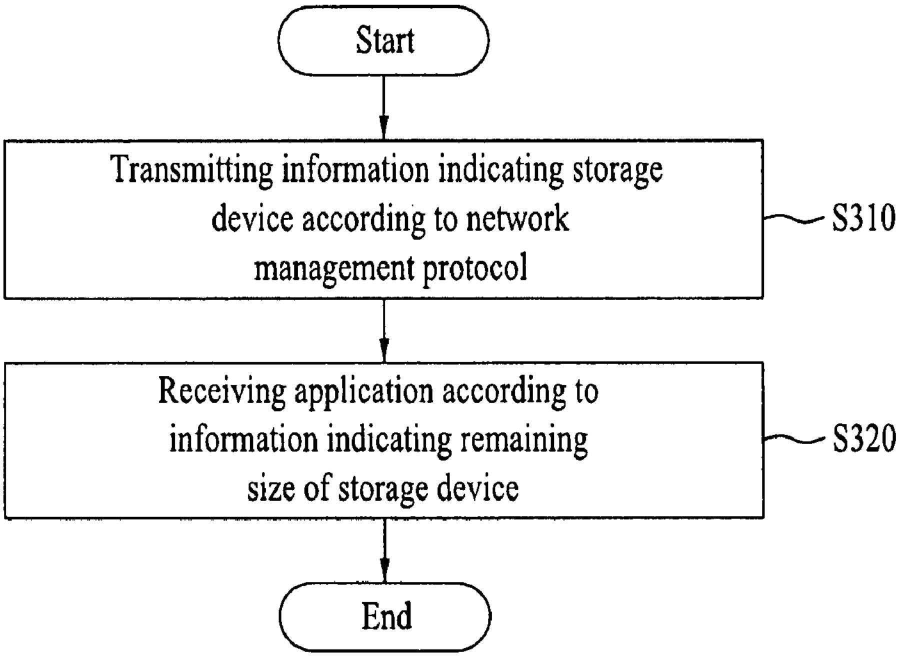
FIG. 12 is a flowchart of a method of receiving an application according to one embodiment of the present invention.

FIG. 12 is a flowchart of a method of receiving an application according to one embodiment of the present invention. Referring to FIG. 12, in case that a broadcast receiver having a storage device receives an application from a broadcast transmitting terminal, the broadcast receiver transmits information indicating a remaining size of the storage device of the broadcast receiver according to a network management protocol (S310). And, the broadcast receiver is able to receive the application according to the information indicating the remaining size of the storage device (S320).

Figure 13:
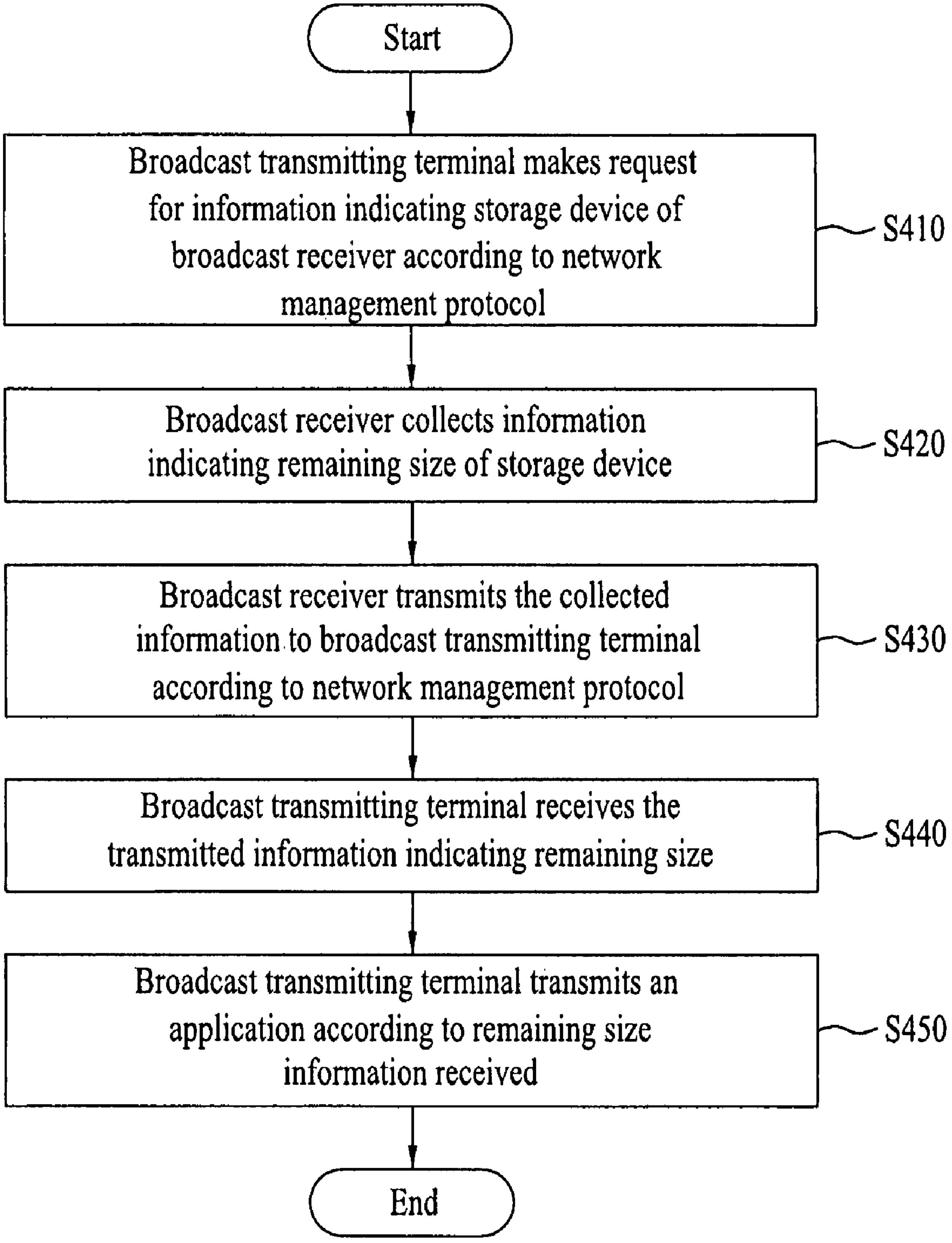
FIG. 13 is a flowchart of a method of transmitting an application according to one embodiment of the present invention.

FIG. 13 is a flowchart of a method of transmitting an application according to one embodiment of the present invention. Referring to FIG. 13, in case that a broadcast transmitting terminal having a storage device transmits an application to a broadcast receiver, the broadcast transmitting terminal makes a request for information indicating a remaining size of the storage device of the broadcast receiver according to a network management protocol (S410).

If so, the broadcast receiver collects the information indicating the remaining size of the storage device (S420) and then transmits the collected information to the broadcast transmitting terminal according to the network management protocol (S430).

If the broadcast transmitting terminal receives the information indicating the remaining size (S440), it is able to transmit the application according to the received information indicating the remaining size (S450). In this case, SNMP can be used as the network management protocol. And, the embodiment shown in FIG. 13 transmits the information according to the 'request-response' method among the SNMO information transmitting/receiving methods.

In case that the broadcast transmitting terminal transmits an application, it is able to transmit the application based on an available storage size of the storage device of the broadcast receiver. If the broadcast receiver stores a previous version of an application in the storage device, the broadcast transmitting terminal is able to transmit the application by considering that the broadcast receiver replaces the application in view of a size of the previously stored application and a remaining size of the storage device. The broadcast transmitting terminal is able to prepare and transmit various versions of an application from a full version to a light-weight version according to several sized.

The broadcast receiving apparatus, application transmitting/receiving method, reception status information transmitting method, and data structure of reception status information according to the present invention are not limited to the aforesaid cable broadcast system only. Instead, they are applicable to any broadcast system capable of bi-directional transmissions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting status information of a host device in a cable broadcast receiver having a plurality of memories, the method comprising:

collecting first status information identifying a type and size of system memory, the system memory type including a read only memory (ROM), a dynamic random access memory (DRAM), a static random access memory (SRAM), a flash memory, and a nonvolatile memory (NVM), second status information indicating a largest available continuous size of a first DRAM, which is fragmented or scattered, among the system memories for the host device, and third status information indicating at least one of a total size of a second DRAM for one or more applications to be received and a size of the second DRAM for the one or more applications to be received that are not allocated and available for use; and transmitting the collected status information according to a network management protocol, wherein the status information is defined as an object type of management information base (MIB) data structure, and wherein the second DRAM is excluded from the system memory.

2. The method of claim 1, wherein the network management protocol is a simple network management protocol (SNMP).

3. A method of receiving an application, which is received by a host device included in a cable broadcast receiver having a plurality of memories from a broadcast transmitting terminal, the method comprising:

transmitting first status information identifying a type and size of system memory, the system memory type including a read only memory (ROM), a dynamic random access memory (DRAM), a static random access memory (SRAM), a flash memory, and a nonvolatile memory (NVM), second status information indicating a largest available continuous size of a first DRAM, which is fragmented or scattered, among the system memories for the host device, and third status information indicating at least one of a total size of a second DRAM for one or more applications to be received and a size of the second DRAM for the one or more applications to be received that are not allocated and available for use in the broadcast receiver according to a network management protocol to a broadcast transmitting terminal; and receiving an application from the broadcast transmitting terminal according to the third status information, wherein the status information is defined as an object type of management information base (MIB) data structure, and wherein the second DRAM is excluded from the system memory.

4. The method of claim 3, wherein the network management protocol is a simple network management protocol (SNMP).

5. A method of transmitting an application, which is transmitted by a broadcast transmitting terminal to a host device included in a cable broadcast receiver having a plurality of memories, the method comprising:

requesting first status information identifying a type and size of system memory, the system memory type including a read only memory (ROM), a dynamic random access memory (DRAM), a static random access memory (SRAM), a flash memory, and a nonvolatile memory (NVM), second status information indicating a largest available continuous size of a first DRAM, which is fragmented or scattered, among the system memories for the host device, and third status information indicating at least one of a total size of a second DRAM for one or more applications to be received and a size of the second DRAM for the one or more applications to be received that are not allocated and available for use according to a network management protocol;

receiving the request first, second and third status information from the broadcast receiver; and transmitting an application to the broadcast receiver according to the received third status information, wherein the status information is defined as an object type of management information base (MIB) data structure, and wherein the second DRAM is excluded from the system memory.

6. The method of claim 5, wherein the network management protocol is a simple network management protocol (SNMP).

7. An apparatus for receiving an application through a network in a host device included in a cable broadcast receiver having a plurality of memories, the apparatus comprising:

a plurality of memories which are fragmented or scattered;

a control unit configured to control to collect first status information identifying a type and size of system memory, the system memory type including a read only memory (ROM), a dynamic random access memory (DRAM), a static random access memory (SRAM), a flash memory, and a nonvolatile memory (NVM), second status information indicating a largest available continuous size of a first DRAM, which is fragmented or scattered, among the system memories for the host device, and third status information indicating at least one of a total size of a second DRAM for one or more applications to be received and a size of the second DRAM for the one or more applications to be received that are not allocated and available for use, and transmit the collected first, second and third status information to a broadcast transmitting terminal according to a network management protocol; and a receiving unit configured to receive an application transmitted from the broadcast transmitting terminal according to the third status information, wherein the status information is defined as an object type of management information base (MIB) data structure, and wherein the second DRAM is excluded from the system memory.

8. The apparatus of claim 7, wherein the network management protocol is a simple network management protocol (SNMP).

* * * * *